United States Patent [19]
Freiburger

[11] B 3,913,414
[45] Oct. 21, 1975

[54] DIFFERENTIAL STRUCTURE FOR PREVENTING LEAKAGE OF DIFFERENTIAL LOCK ACTUATING FLUID TO THE DIFFERENTIAL HOUSING

[75] Inventor: Thomas William Freiburger, Dubuque, Iowa

[73] Assignee: Deere & Company, Moline, Ill.

[22] Filed: Sept. 29, 1972

[21] Appl. No.: 293,437

[44] Published under the Trial Voluntary Protest Program on January 28, 1975 as document no. B 293,437.

[52] U.S. Cl. ............................................. 74/710.5
[51] Int. Cl.² ......................................... F16H 1/38
[58] Field of Search .................... 74/710.5, 710, 753

[56] References Cited
UNITED STATES PATENTS
3,089,349  5/1963  Thornton .......................... 74/710.5
3,383,950  5/1968  Kerschner ......................... 74/710.5

FOREIGN PATENTS OR APPLICATIONS
596,091  7/1959  Italy ................................. 74/710.5

*Primary Examiner*—Charles J. Myhre
*Assistant Examiner*—R. H. Lazarus

[57] ABSTRACT

A drive axle assembly includes a central differential housing in which is located differential gearing for driving oppositely extending drive axles. A hydraulically actuated piston is located within the differential housing for selectively locking the differential gear such that the pair of drive axles will rotate as a solid shaft. The differential housing includes an oil reservoir through which the differential gearing passes during operation and zero-leak seals are provided in conjunction with the fluid passages conveying actuating fluid to the piston for preventing the leakage of actuating fluid to the reservoir.

5 Claims, 2 Drawing Figures

DIFFERENTIAL STRUCTURE FOR PREVENTING LEAKAGE OF DIFFERENTIAL LOCK ACTUATING FLUID TO THE DIFFERENTIAL HOUSING

BACKGROUND OF THE INVENTION

This invention relates to a vehicle drive axle structure and more particularly relates to an improved means for preventing differential lock actuating fluid from leaking into the lubrication fluid reservoir of the differential housing.

A conventional vehicle drive axle structure includes a central differential gear which drives a pair of oppositely extending drive axles, the differential gear and inner ends of the drive axles being mounted in a closed housing, which is partly filled with oil to provide lubrication for the differential gearing. The differential gearing includes a ring gear carrier which is mounted for rotation coaxial with the drive shafts, the carrier having a differential lock-applying piston located therein and selectively actuatable to lock the differential gearing so as to cause the drive shafts to rotate as a solid shaft. An annular fluid manifold is provided for conveying differential lock actuating fluid to actuating fluid passages contained in the rotating carrier member. At the location at the interface of the rotating carrier member and the fluid manifold whereat the fluid passes from the manifold to the actuating fluid passages in the carrier member, there is provided metal annular sealing rings for preventing the leakage of pressure fluid to the housing.

It has been found that these metal sealing rings permit enough leakage to occur that the oil level in the housing reservoir is raised to the extent that efficiency of the drive axle assembly is substantially lowered due to the differential gearing having a pass through this additional fluid.

While others have attempted to correct the leakage problem by substituting elastomeric zero-leakage seals for the steel sealing rings, this procedure has proved to be unsatisfactory since elastomeric sealing rings seated with enough force to prevent the high-pressure fluid from leaking along the interface of the manifold and carrier assembly do not have enough durability for normal operation.

SUMMARY OF THE INVENTION

According to the present invention, means are provided for preventing the leakage of differential lock actuating fluid to the housing reservoir. More specifically, means are provided for trapping actuating fluid leaking past a pair of metal sealing rings, the trapped fluid being returned to the hydraulic system sump.

Another object of the invention is to rotatably support the carrier member from the manifold member through means of an annular bearing, and to position the bearing such that it is lubricated by means of the trapped leakage fluid.

These and other objects will become apparent from the following description and the appended drawings.

DESCRIPTION OF THE PREFERRED EMBODIMENT

Figure 1:
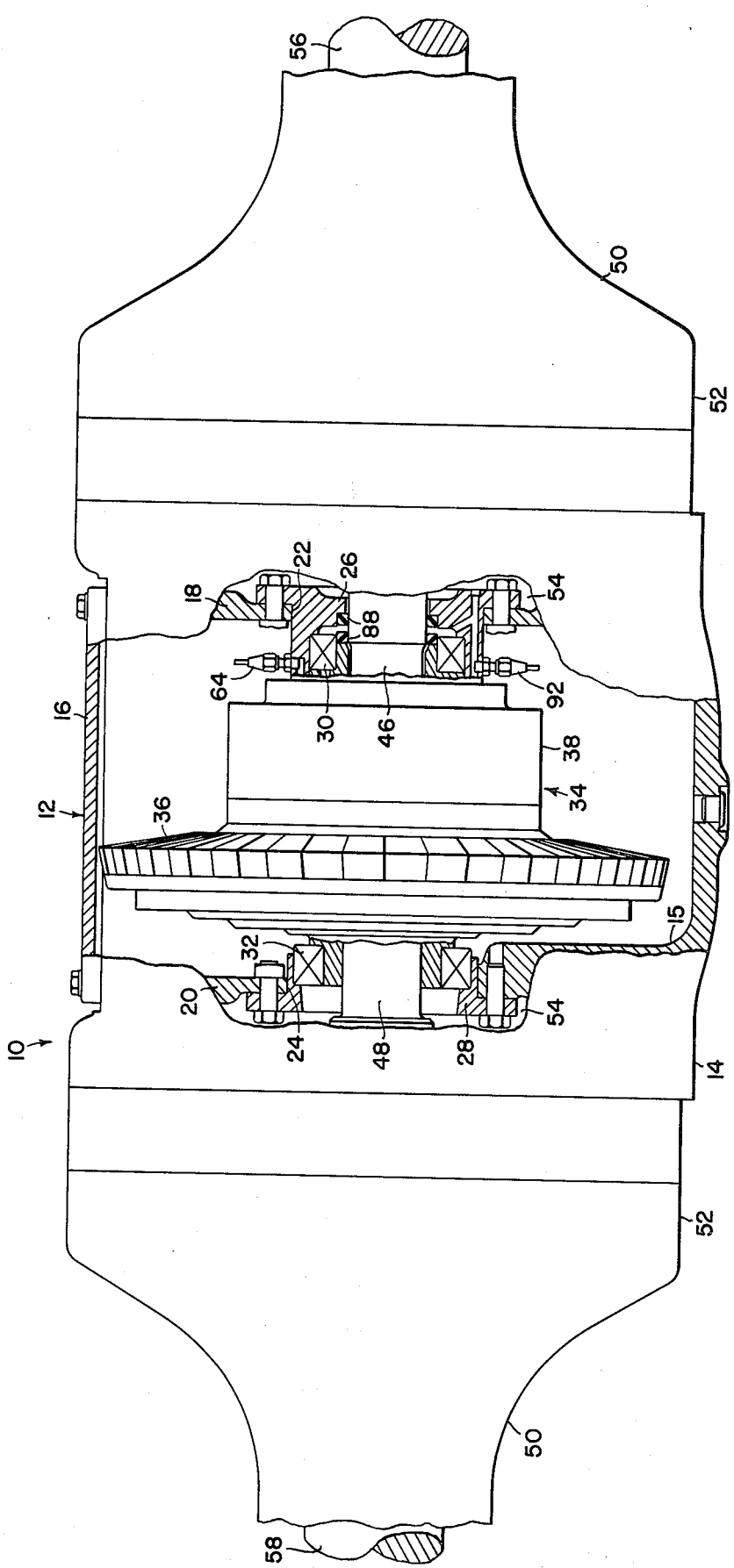
FIG. 1 is a fragmentary rear elevational view of a drive axle assembly embodying the present invention, portions of the assembly being broken away and other portions being shown in axial cross section.
Figure 2:
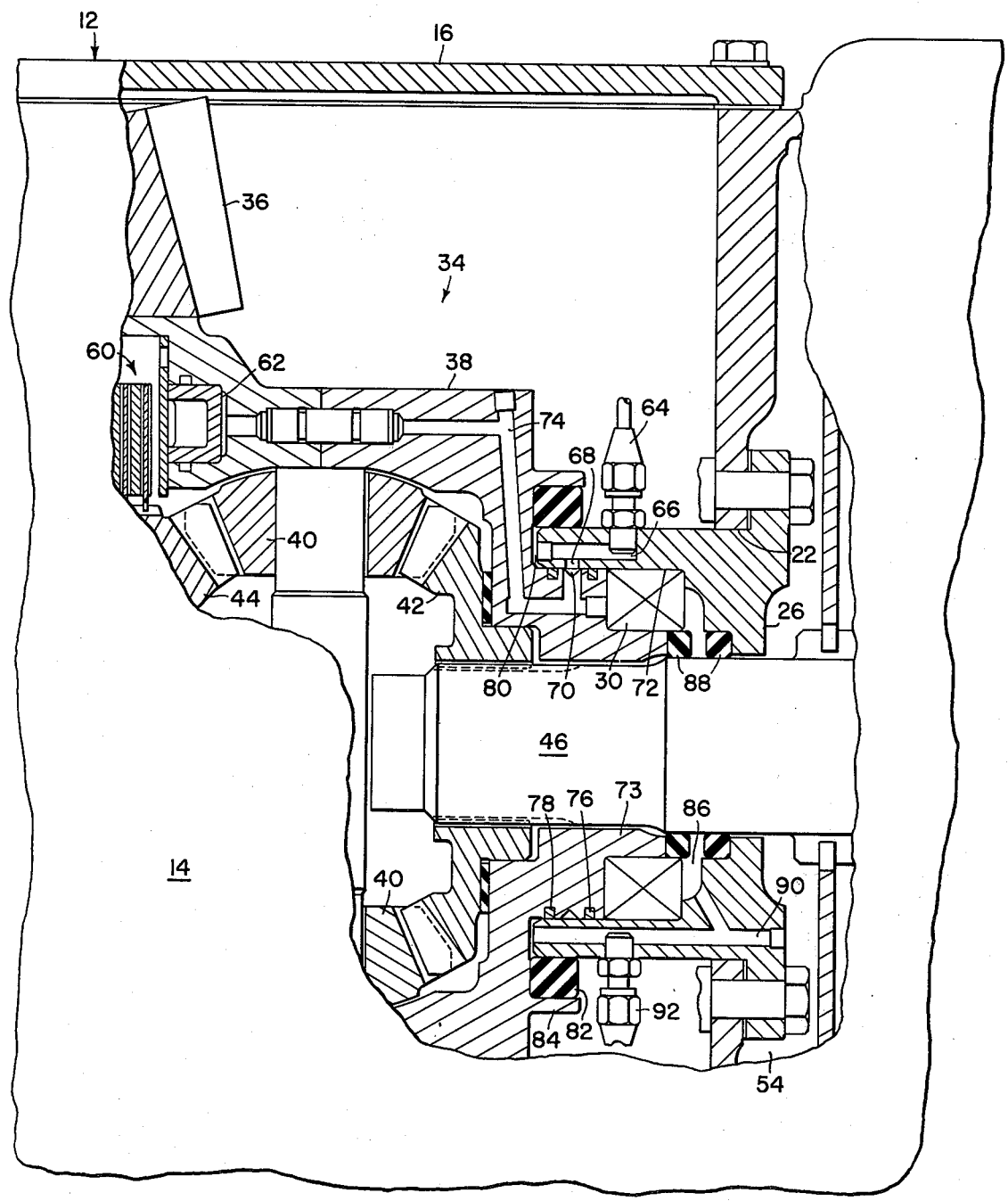
FIG. 2 is an enlarged fragmentary view of the central portion of the assembly shown in FIG. 1 with additional structure being shown in axial cross section to expose the fluid passage and sealing arrangement of the present invention.

The invention is embodied in a drive axle structure indicated in its entirety by the numeral 10, only a central portion of the drive axle structure being shown in the drawings since the invention is associated with the central portion of the structure, the opposite ends of the drive axle structure being of conventional construction. The drive axle structure 10 includes a housing 12 which typically includes an enlarged hollow differential housing portion 14 defining a central cavity 15 for holding lubrication fluid and having its top closed by a flat top plate 16. With reference to FIG. 1, the differential housing portion 14 includes right and left upright, identical side walls 18 and 20 respectively, having transversely aligned bores 22 and 24 into which right and left bearing retainers 26 and 28 are respectively bolted, the right retainer 26 also serving as a fluid manifold as will be further described below. The bearing retainers 26 and 28 are annularly shaped and respectively supportingly contain coaxial differential bearings 30 and 32. Differential gearing 34 of conventional construction is located within the differential housing portion 14 and is journaled in the opposite bearings 30 and 32.

The differential gearing 34 comprises a ring gear 36 which is fixed to a differential carrier 38 which includes a plurality of differential pinions 40 in constant mesh with right and left side gears 42 and 44 which are respectively keyed to right and left differential output shafts 46 and 48 which respectively extend coaxially through and are loosely received in the bearing retainers 26 and 28.

A pair of axle housings 50 of substantial identical construction extend from opposite sides of the differential housing portion 14. Each axle housing has an enlarged hollow inner end 52 secured to the side of the differential housing portion 14 by a number of bolts (not shown). The hollow inner ends of the axle housings 50 form substantially closed cavities 54 on opposite sides of the differential housing cavity 15. Each of the axle housings 50 contain identical planetary gearing (not shown) which have inputs connected to the output shafts 46 and 48 and which have outputs respectively connected to right and left drive axles 56 and 58.

A multiple disk clutch 60 is selectively engageable and disengageable between the left-hand side gear 44 and the differential carrier 38. When the clutch is disengaged or released, the differential performs its normal function. When the clutch is engaged, the differential is locked up and both axles 56 and 58 are driven as one. The clutch 60 is controlled through means of a hydraulically actuated clutch piston 62 deriving fluid pressure in the first instance from a pump (not shown). Specifically, pump supplied fluid pressure is connected to the clutch piston by passage means including a pressure fluid inlet connection 64 located on the right bearing retainer 26 and communicating with an axially extending drilled passage 66, which through means of a radial port 68 in the bearing retainer is fluidly connected to an annular groove 70 located at an interface 72 formed between the right bearing retainer and an annular cylindrical right end portion 73 of the differential carrier 38. A drilled passage 74 in the differential carrier provides fluid communication between the clutch piston 62 and the annular groove 70.

Respectively located at the right and left sides of the annular groove at the interface 72 are metal sealing rings 76 and 78 which are seated in grooves provided in the differential carrier 38. These metal sealing rings prevent a substantial portion of the inlet fluid pressure from leaking along the interface 72, the wear life of the sealing rings being adequate to withstand the relative rotation between the differential carrier and the right bearing retainer. The left end of the right bearing retainer 26 is spaced as at 80 from the differential carrier 38, the space 80 providing fluid communication between the interface 72 and a left elastomeric zero-leak sealing ring 82 which is compressed between an axially extending annular rim 84 formed on the differential carrier 38 and the outer surface of the right bearing retainer. For simplicity, the elastomeric sealing ring 82 is here shown as a solid elastomeric member; however, the preferable type of sealing ring would be a lip seal of composite metal and elastomer construction wherein the elastomer constitutes an annular sealing ring portion which contacts the bearing retainer. In any event, the zero-leak seal 82 need only to be a seal which is capable of preventing the low-pressure leakage fluid which passes the left metal sealing ring 76 from entering the housing cavity 15 while at the same time being durable enough to withstand the relative rotation between the differential carrier and the right differential bearing retainer. The right differential bearing 30 is located at the interface 72 at a location at the right side of the right metal sealing ring 76 and at the right end of the bearing retainer 26. The right end of the differential carrier 38 is spaced leftwardly of the right end of the bearing retainer 26 and defines a space 86 therewith which leads to the right differential output shaft 46. In order to prevent low-pressure fluid which passes by the right metal sealing ring 76 from flowing into the cavity 15 along the output shaft 46, there are provided a pair of zero-leak sealing rings 88, one of each pair being respectively mounted so as to prevent the flow of fluid from the space 86 to the cavity 15 of the differential housing portion to the cavity 54 in the right axle housing 50. Here again, the elastomeric zero-leak sealing rings 88 are shown as solid elastomer members whereas preferably the sealing rings would be of the lip seal type aforedescribed in conjunction with the description of the seal 82. Fluid is drained from the spaces 80 and 86 through means of a drilled passage 90 located in the bearing retainer 26 in fluid communication with the spaces and having a return line connection 92 in communication therewith. Thus, the zero-leak sealing rings 82 and 88 cooperate with the differential carrier 38 and the right bearing retainer 26 to define a fluid-tight receptacle for receiving the fluid leaking past the metal sealing rings 76 and 78, the drain passage 90 acting to drain fluid from the receptacle.

In operation of the drive axle assembly, the housing cavities 15 and 54 will normally be filled, to an optimum level with lubrication fluid so that the differential gearing and the gearing for the planetary drive means for the axles will be adequately lubricated and at the same time will not have to travel through an excess amount of fluid thus resulting in inefficient operation. Also, the level of lubrication fluid is high enough to keep the left differential bearing 32 adequately lubricated under all terrain conditions, as will be further described, while the right differential bearing 30 is always kept lubricated by the fluid leaking past the right metal sealing ring 76, it being noted that the bearing 30 is otherwise sealed from communication with the lubrication fluid contained in the housing of the axle assembly.

When the left side of the assembly 10 is located lower than the right side, fluid in the cavity 15 will keep the bearing 32 lubricated while fluid in the left housing cavity 54 will keep the bearing 32 lubricated when the right side of the assembly is located lower than the left side.

Pressure fluid for actuating the clutch piston 62 is at all times prevented from flowing into the housing 12 by means of the metal sealing rings 76 and 78, which allow a small amount of fluid to leak along the interface 72 to the spaces 80 and 86, and the zero-leak seals 82 and 88 which prevent this small amount of fluid from passing into the housing. It is here noted that the metal sealing rings and the zero-leak sealing rings are relatively durable, the latter's durability being attributable to the fact that the fluid leaking past the rings 76 and 78 is at a low pressure and not much radial sealing force is required to prevent the leakage of this low-pressure fluid thus resulting in low frictional wear to the zero-leak seals during rotation of the differential carrier 38 and the right differential output shaft 46.

It can be appreciated that, with the sealing arrangement thus described, different fluid can be used respectively for actuating the clutch piston and for lubricating the differential and final drive gearing. This makes it possible then to select fluids which are desirable from the standpoint of being a good lubrication fluid and being a fluid suitable for actuating a piston.

While the present invention has been described as embodied in an axle assembly, it is to be understood that the principles thereof are applicable to any situation wherein a housed rotating member carries a hydraulically actuatable function, the rotating member including elements passing through an optimum level of lubricating fluid in the housing and being rotatably supported by a fixed member in the housing.

I claim:

1. In a combination including a fixed housing defining a fluid cavity in the lower portion thereof for holding an optimum level of fluid, drivable means rotatably mounted in said housing and including a portion which, during rotation, traces a path passing through the fluid cavity below the optimum level of fluid, a fluid manifold member being located in the housing and defining a first cylindrical mounting surface formed about a fixed axis, said drivable means including a second cylindrical mounting surface disposed in sliding engagement with said first cylindrical mounting surface and thus forming an interface between the drivable means and the manifold member, said drivable means further including a fluid pressure actuatable element, a fluid pressure inlet passage means being connected to the element and including first and second fluid passages located respectively in said drivable means and said manifold member and being joined in fluid communication at a location at said interface, and first and second sealing rings respectively located at the interface at the opposite sides of said location for preventing a substantial amount of the pressure fluid leakage which would occur along said interface in the absence of the sealing rings, the improvement comprising: zero-leak sealing means located for blocking the flow of any fluid leaking past the first and second sealing rings from reaching the fluid-holding cavity of the housing; and drain passage means located in said manifold member and being in fluid communication with said interface at locations at the opposite sides of the sealing rings from the location at which said first and second fluid passages are in fluid communication with each other for draining fluid leaking past the first and second sealing rings.

2. In a vehicle differential assembly of the type including differential gearing located within a housing and drivingly connected to oppositely extending differential output shafts, said gearing being lubricated by passing through fluid located in a fluid cavity defined by the housing, a hydraulically-operated differential lock piston carried by an annular member loosely receiving and being disposed coaxially with one of said output shaft axles, an annular manifold member fixed in the housing and loosely receiving said one output shaft, said annular member being rotatably mounted on said manifold member and forming a cylindrical interface therewith, first and second inlet fluid passage portions being respectively located in said manifold member and annular member and being in fluid communication at a location at said interface, said second inlet fluid passage portion being connected to said differential lock piston, and a pair of circular sealing rings being located at the interface at opposite sides of said location at the interface to prevent a substantial portion of the inlet fluid from leaking towards the fluid cavity of the housing, the improvement comprising: zero-leak sealing means located so as to block the flow of any fluid leaking past the pair of sealing rings from reaching the fluid cavity of the housing; and drain passage means located in said manifold member and being in fluid communication with said interface at locations at the opposite sides of the sealing rings from the location at which said first and second inlet passage portions are in fluid communication with each other for draining any leakage fluid from the housing.

3. The combination defined in claim 2 wherein the interface between the annular and manifold members is located within the manifold member and has an annular differential bearing located thereat for supporting the annular member from the manifold member; said bearing being in the path of fluid flowing past one of said sealing rings; one end of said annular member terminating in axially spaced relationship from a shoulder formed on said manifold and defining the opening through which the one differential output shaft extends, the space between the one end of the annular member and the shoulder of the manifold member being in fluid communication with the bearing at the side opposite from said one sealing ring and said zero-leak sealing means including a pair of zero-leak annular seals located respectively at the one end of said annular member and at the shoulder of said manifold member for preventing leakage fluid from passing along the one differential output shaft into the housing cavity.

4. The combination defined in claim 3 wherein said housing includes side-by-side compartments separated by a partition wall and said manifold member having one end fixed to said wall and containing said shoulder whereby one of the pair of zero-leak annular seals not only prevents leakage fluid from passing into the housing cavity but also prevents the fluid normally held in said fluid cavity from passing between the two compartments by way of a path along the one differential output shaft.

5. In a combination including a housing defining a fluid cavity for holding an optimum level of lubrication fluid, drivable means having at least one end portion rotatably supporting said drivable means from the housing for rotation about a fixed axis located above said optimum level, the one end portion and the housing defining a cylindrical interface, said drivable means including a pressure actuatable element, a fluid pressure inlet passage means being connected to said element and including first and second fluid passages respectively located in said housing and drivable means and joined at a location at said interface, and first and second sealing rings respectively located at said interface at the opposite sides of said location and being constructed for preventing all but a small amount of pressure fluid from leaking into the housing along the interface, the improvement comprising: zero-leak sealing means positioned at the opposite sides of said pair of sealing rings from said location and acting between said housing and drivable means for defining a fluid-tight receptacle surrounding said pair of sealing rings; and drain passage means located in said housing and being in fluid communication with said receptacle for draining fluid therefrom.

* * * * *